(12) United States Patent
Haddon et al.

(10) Patent No.: US 6,368,569 B1
(45) Date of Patent: *Apr. 9, 2002

(54) METHOD OF SOLUBILIZING UNSHORTENED CARBON NANOTUBES IN ORGANIC SOLUTIONS

(75) Inventors: Robert C. Haddon; Jian Chen, both of Lexington; Mark A. Hamon, Carlisle, all of KY (US)

(73) Assignee: University of Kentucky Research Foundation, Lexington, KY (US)

(*) Notice: Subject to any disclaimer, the term of this patent is extended or adjusted under 35 U.S.C. 154(b) by 0 days.

This patent is subject to a terminal disclaimer.

(21) Appl. No.: 09/409,787

(22) Filed: Sep. 30, 1999

Related U.S. Application Data

(60) Provisional application No. 60/102,909, filed on Oct. 2, 1998, and provisional application No. 60/102,787, filed on Oct. 2, 1998.

(51) Int. Cl.[7] .......................... C09C 1/56; C09C 61/09; C09C 233/00
(52) U.S. Cl. ..................... 423/460; 562/509; 564/123
(58) Field of Search ..................... 423/460; 562/509; 564/123

(56) References Cited

U.S. PATENT DOCUMENTS

| | | |
|---|---|---|
| 5,560,898 A | 10/1996 | Uchida et al. |
| 5,695,734 A | 12/1997 | Ikazaki et al. |
| 5,698,175 A | 12/1997 | Hiura et al. |
| 5,716,708 A | 2/1998 | Lagow |
| 6,187,823 B1 * | 2/2001 | Haddon et al. ............... 516/32 |

OTHER PUBLICATIONS

Thomas W. Ebbesen, "Cones and Tubes: Geometry in the Chemistry of Carbon," Acc. Chem. Res., vol. 31 (No. 9), p. 558–566, (Jul. 17, 1998).

Y. Chen and R.C. Haddon, "Chemical Attachment Of Organic Functional Groups to Single–Walled Carbon Nanotube Material," Materials Research Society, vol. 13 (No. 9), p. 2423–2431, (Sep. 9, 1998).

Boris I. Yakobson and Richard E. Smalley, "Fullerence Nanotubes: C 1,000,000 and Beyond," American Scientist, p. 324–337.

C. Journet et al., "Large–Scale Production Of Single–Walled Carbon Nantubes By The Electric–Arc Technique," Nature, vol. 388 (No. 21), p. 56–58, (Aug. 21, 1997).

A.G. Rinzler et al., "Large–Scale purification of Single–Wall Carbon Nanotubes: Proecss, Product, and Characterization," Appl. Phys. p. 29–37, (Dec. 16, 1998).

Erik Duijardin et al., "Purification of Singel–Shell Nanotubes," Communications, Wiley–VCH, vol. 10 (No. 8), p. 611–613, (Dec. 16, 1998).

Jian Chen et al., "Solution Properties of Single–Walled Carbon Nanotubes," Reports, Science, p. 95–98, (Oct. 2, 1998).

* cited by examiner

Primary Examiner—Johann Richter
Assistant Examiner—J. Parsa
(74) Attorney, Agent, or Firm—King & Schickli, PLLC

(57) ABSTRACT

Naked carbon nanotubes are dissolved in organic solutions by terminating the nanotubes with carboxylic acid groups and attaching an aliphatic carbon chain so as to render the carbon nanotubes soluble.

7 Claims, No Drawings

METHOD OF SOLUBILIZING UNSHORTENED CARBON NANOTUBES IN ORGANIC SOLUTIONS

This application claims the benefit of U.S. Provisional Application No. 60/102,909 filed Oct. 2, 1998 and U.S. Provisional Application No. 60/102,787 filed Oct. 2, 1998.

This invention was made with Government support under NSF-EPSCOR grant EPS-9452895. The Government may have certain rights in this invention.

TECHNICAL FIELD

The present invention relates to the dissolution of full length or unshortened carbon nanotubes in solutions and more particularly, to a method of dissolving naked nanotube carbon metals and semiconductors in organic solutions.

BACKGROUND OF THE INVENTION

All previous work on carbon nanotubes (both single-walled and multi-walled) has been carried out on the usual intractable, insoluble form of this material [Yakobson, B. I.; Smalley, R. E., Fullerene Nanotubes: C1,000.000 and Beyond. American Scientist 1997, 85, 324–337.] This form of the material is not amenable to many of the processing steps that are necessary if the carbon nanotubes (CNTs) are to reach their full potential—particularly in applications that require these materials in the form of polymers, copolymers, composites, ceramics and moldable forms.

While present forms of the CNTs can be heterogeneously dispersed in various media, the interactions between the CNTs and host and between the CNTs themselves are simply physical, and without the formation of chemical bonds. Thus, the advantageous properties of the CNTs are unlikely to be realized on a macroscopic level. What is needed is a method to prepare well-dispersed forms of CNTs perhaps by inducing them to exfoliate from the bundles and dissolve in organic solvents. Although long believed to be impossible, [Ebbesen, T. W., Cones and Tubes: Geometry in the Chemistry of Carbon. Acc. Chem. Res. 1998, 31, 558–566] we now teach such a procedure for the dissolution of all types of CNTs [Chen, J.; Hamon, M. A.; Hu, H.; Chen, Y.; Rao, A. M.; Eklund, P. C.; Haddon, R. C., Solution Properties of Single-Walled Carbon Nanotubes. Science 1998, 282, 95–98; Hamon, M. A.; Chen, J.; Hu, H.; Chen, Y.; Rao, A. M.; Eklund, P. C.; Haddon, R. C., Dissolution of Single-Walled Carbon Nanotubes. Adv. Mater. 1999, 11, 834–840].

SUMMARY OF THE INVENTION

Accordingly, it is a primary object of the present invention to overcome the above-described limitations and disadvantages of the prior art by providing (1) a method of solubilizing carbon nanotubes; and (2) solutions of carbon nanotubes dissolved in an organic solvent. Such solutions are anticipated to be useful in the functionalization chemistry of the open ends, the exterior walls or convex face and the interior cavity or concave face of carbon nanotubes and processing useful nanotube based polymer, copolymer and composite products and devices for a multitude of applications in various industries including aerospace, battery, fuel cell, healthcare and electromagnetic radiation shielding.

Advantageously, as a result of the present invention, functionalization chemistry of the CNTs can be determined through the study of both the ionic and covalent solution phase chemistry with concomitant modulation of the single wall nanotube band structure.

Additional objects, advantages, and other novel features of the invention will be set forth in part in the description that follows and in part will become apparent to those skilled in the art upon examination of the following or may be learned with the practice of the invention. The objects and advantages of the invention may be realized and attained by means of the instrumentalities and combinations particularly pointed out in the appended claims.

To achieve the foregoing and other objects, and in accordance with the purposes of the present invention as described herein, a novel and improved method of dissolving CNT metals and semiconductors in common organic solutions is provided. The method comprises terminating the CNTs with carboxylic acid groups. This is followed by the attaching of an aliphatic carbon chain to the of the CNTs so as to render the CNTs soluble in the selected organic solvent.

The terminating step may be further described as the reacting of the CNTs with a mineral acid. This may be accomplished by adding a mineral acid (eg. HCl, $HNO_3$, $H_2SO_4$) to an aqueous suspension of the CNTs to protonate the carboxylate groups. The attaching step includes directly reacting the carbon nanotubes with an amine having a formula $RNH_2$ or $R_1R_2NH$ wherein R, $R_1$ and $R_2=(CH_2)_nCH_3$ where n=9–50. Alternatively, the attaching step includes directly reacting the carbon nanotubes with an alkylaryl amine having a formula $RNH_2$ or $R_1R_2NH$ wherein R, $R_1$ and $R_2=(C_6H_4)(CH_2)_nCH_3$ where n=5–50.

In accordance with yet another alternative, the attaching step includes the steps of (a) converting the carboxylic acid groups on the carbon nanotubes to acid chloride groups by reacting the carbon nanotubes with a reagent selected from a group consisting of $SOCl_2$, $PCl_5$ and any mixtures thereof; (b) mixing the acid chloride converted carbon nanotubes with an amine or alkylaryl amine having a formula $RNH_2$ or $R_1R_2NH$ wherein R, $R_1$ and $R_2=(CH_2)_nCH_3$ and n=9–50 or R, $R_1$ and $R_2=(C_6H_4)(CH_2)_nCH_3$ and =5–50; and (c) heating the resulting mixture to a temperature between 50–200° C. More preferably, the heating step is to 90–100° C. for at least 96 hours.

The method may also be described as including the further step of dissolving the resulting carbon nanotubes in the selected organic solvent. That organic solvent is preferably an aromatic or chlorinated solvent. Solvents in which the CNTs of the present invention may be solubilized include but are not limited to chloroform, dichloromethane, benzene, toluene, chlorobenzene, 1,2-dichlorobenzene, dichlorocarbonbenzene, ether, tetrahydrofuran and mixtures thereof.

Advantageously, such a solution not only allows the study of the functionalization chemistry of the open ends, the exterior walls or convex face and the interior cavity or concave face of the nanotubes, but also processing of the nanotubes into useful products for various applications including as intermediates in the preparation of polymer, copolymer and composite materials.

Still other objects of the present invention will become apparent to those skilled in this art from the following description wherein there is shown and described a preferred embodiment of this invention, simply by way of illustration of one of the modes and alternate embodiments best suited to carry out the invention. As it will be realized, the invention is capable of still other and different embodiments, and its several details are capable of modifications in various, obvious aspects all without departing from the invention. Accordingly, the drawings and descriptions will be regarded as illustrative in nature and not as restrictive.

DETAILED DESCRIPTION OF THE INVENTION

In the novel method of the present invention, we begin with raw, as prepared, CNT soot (AP-CNTs). The AP-CNTs come in two basic forms: AP-single-walled carbon nanotubes (AP-SWNTs) available from CarboLex, Inc. of Lexington, Kentucky and AP-multi-walled carbon nanotubes (AP-MWNTs) available from MER Corporation of 7960 South Kolb Rd, Tucson, Ariz. 85706. The AP-SWNTs are prepared by use of an electric arc technique similar to that described by Journet, C.; Maser, W. K.; Bernier, P.; Loiseau, A.; Lamy de la Chappelle, M.; Lefrant, S.; Deniard, P.; Lee, R. and Fischer, J. E., in Large Scale Production of Single-Walled Carbon Nanotubes by the Electric-Arc Technique. Nature 1997 388, 756–758. The estimated purity of this material is 40–60% SWNT by volume. Batches of 10 grams may be prepared in a single run and there is considerable scope for further increase in scale. Thus it is possible to contemplate the very large-scale production of this material in the future. The AP-MWNTs are of an estimated purity of less than 10% and the nanotubes are of poor quality with many defective and fused together. We describe herein routes to soluble CNTs, starting from AP-SWNTs and AP-MWNTs.

In accordance with the present invention, full length or unshortened carbon nanotubes are solubilized. This is accomplished utilizing a simple procedure which advantageously preserves the length of the carbon nanotubes which is one of their primary attractions in many applications.

There are basically two steps in all of our procedures. (1) a pretreatment, or purification step that serves to add carboxylic acid functionalities to the nanotubes, (2) a chemical functionalization step that modifies the carboxylic acid in a way that attaches a long aliphatic carbon chain to the end of the nanotube, and thereby renders the CNTs soluble in some organic solvents.

Purification is a desired step because the AP-CNTs contain extraneous material. In particular the AP-CNTs contain metal catalyst, nanoparticles (carbonaceous particles sometimes containing metals), graphite, amorphous carbon, fullerenes and other contaminants.

A first purification procedure is a variation of a previously published method [Liu, J.; Rinzler, A. G.; Dai, H.; Hafner, J. H.; Bradley, R. K.; Boul, P. J.; Lu, A.; Iverson, T.; Shelimov, K.; Huffman, C. B.; Rodriguez-Macias, F.; Shon, Y.-S.; Lee, T. R.; Colbert, D. T.; Smalley, R. E., Fullerenes Pipes. Science 1998, 280, 1253–1255] [Rinzler, A. G.; Liu, J.; Dai, H.; Nilolaev, P.; Huffman, C. B.; Rodriguez-Macias, F. J.; Boul, P. J.; Lu, A. H.; Heymann, D.; Colbert, D. T.; Lee, R. S.; Fischer, J. E.; Rao, A. M.; Eklund, P. C.; Smalley, R. E., Large-Scale Purification of Single-Wall Carbon Nanotubes: Process, Product and Characterization. Appl. Phys. A 1998, 67, 29–37].

AP-CNTs are refluxed in 2–3M nitric acid for about 48 hours (200–300 ml 2–3M nitric acid per gram of AP-CNTs). After centrifugation, the supernatant solution is decanted. The pH of the solid is adjusted to about 7 by monitoring the pH of the supernatant liquid through repeated cycles of washing, centrifugation and decantation.

The resulting solid is suspended in an 0.5% aqueous solution of sodium dodecyl sulfate (SDS) by sonication for 2–4 hours (200–400 ml surfactant solution per grain of AP-CNTs); the solution pH is then adjusted to 9–10 by addition of sodium hydroxide. Filtration through a cotton plug gives a black-colored suspension.

In the case of the SWNTs, the resulting suspension is subjected to cross-flow filtration (CFF). The CFF cartridge has the following specifications: fiber diameter of 0.6 mm, pore size of 200 nm and surface area of 0.56 m². The buffer solution is made up to contain 0.5% SDS at a pH of 9–10 (adjusted by addition of NaOH). Initially the filtrate is black. The CFF is halted when the filtrate has become light brown. HCl is added to the resulting suspension to terminate the CNTs with carboxylic acid groups (~COOH $v_{C=O}$=1719 cm$^{-1}$) rather than carboxylate groups (~COO$^-$, $v_{C=O}$=1620 cm$^{-1}$).

After centrifugation, the black solid is washed with distilled water and ethyl alcohol and dried at room temperature. The purity of the resulting CNTs is around 90 vol. %, and the yield is 10–30% (based on AP-SWNTs).

A specific example of this purification procedure is found below in Example 1.

EXAMPLE 1

AP-SWNTs (6.3 g) were refluxed in 700 mL of 2 M HNO$_3$ for 48 hrs (oil bath at 130° C.). The mixture was centrifuged at 2000 rpm for 30 min. The acid layer was discarded and the solid was washed with water and then mixed into a 0.5% wt. solution of SDS in water (1500 mL). NaOH was added to the solution until the pH was above 10. The mixture was sonicated for 10 hrs. The suspension was acidified with HCl so that the acid form of the SWNTs precipitated and then it was centrifuged at 2000 rpm for 30 min. The water layer was decanted and passed through a membrane filter, pore size 1.2 μm. The solid slurry was then subjected to membrane filtration. Yield: 2.35 g.

A second or alternative purification procedure is also a variation of a previously published method [Ebbesen, T. W.; Dujardin, E.; Krishnan, A.; Treacy, M. M. J., Purification of Single-Shell Nanotubes. Adv. Mater. 1998, 10, 611–613]. It is simpler, but less complete than the first purification procedure.

AP-CNTs are refluxed in 70% nitric acid until the emission of dense brown vapors ceases (for 4 g AP-SWNTs, this usually takes 10–12 hours). After centrifugation, the brown-colored supernatant solution is decanted. The pH of the solid is adjusted to about 7 by monitoring the pH of the supernatant liquid through repeated cycles of washing, centrifugation and decantation.

The resulting solid is washed with ethyl alcohol and dried at room temperature under reduced pressure. The purity of the CNTs is around 70–80 vol. %, and the yield is 40–50% (based on AP-CNTs).

Next is the polishing of the CNTs. It is hypothesized that the polishing step removes polar hydroxylic functionality from the processed CNTs. These hydroxylic species may be physically or chemically attached to the purified, shortened CNTs. At the end of this treatment the CNTs are less hydrophilic (less susceptible to forming aqueous dispersions).

Specifically, the purified CNTs are stirred in a 4:1 mixture of 90% sulfuric acid and 30% hydrogen peroxide at 60–80° C. for 20–35 minutes (300–500 ml of liquid per gram of purified CNTs).

The resulting mixture is diluted 3–4 times by pouring into distilled water and cooled to room temperature. After membrane filtration (100–200 nm pore size), washing with distilled water and ethyl alcohol, and drying at room temperature under reduced pressure, the polished CNTs are obtained (40–50% yield based on purified SWNTs). A specific example of the polishing procedure is found below in Example 2.

EXAMPLE 2

0.42 g of purified SWNTs were heated at 70° C. in 50 mL of 4:1 $H_2SO_4$ (90%) to $H_2O_2$ (30%) for 15 minutes. Water (300 mL) was added to the mixture, and it was filtered (membrane pore size 0.2 μm), washed with water and dried.

The next step in the method of solubilizing is to attach an aliphatic carbon chain to the SWNTs so as to render the SWNTs soluble in the selected organic solvent. This may be accomplished in several ways.

The carboxylic acid groups on the CNTs may be directly reacted with an amine or an alkylaryl amine having the formula $RNH_2$ or $R_1R_2NH$ wherein R, $R_1$ and $R_2=CH_3(CH_2)_n$, where n=9–50 or R, $R_1$ and $R_2=(C_6H_4)(CH_2)_nCH_3$ where n=5–50 via the formation of a zwitterion. This is done with simple acid-base chemistry by mixing the shortened CNTs with an appropriate quantity of amine or alkylaryl amine having the formulae just described either without any solvent or in an appropriate aromatic solvent such as toluene. Amines that may be utilized include, but are not limited to, nonylamine, dodecylamine octadecylamine, pentacosylamine, tetracontylamine, pentacontylamine and any mixtures thereof. Alkylaryl amines that may be utilized include 4-pentylaniline, 4-dodecylaniline, 4-tetradecylaniline, 4-pentacosylaniline, 4-tetracontylaniline, 4-pentacontylaniline and any mixtures thereof. Long alkyl chains of at least 5 and more preferably 9 carbon atoms and up to 50 carbon atoms are required to increase the solubility of the resulting shortened CNTs product. The mixture is then heated to substantially 50°–200° C. and more preferably 90°–100° C. for approximately 96 hours.

In sharp contrast to unprocessed CNTs of the prior art which are insoluble in organic solvents, the processed CNTs of the present invention include long alkyl chains that provide substantial solubility in tetrahydrofuran, chloroform and aromatic solvents such as benzene, toluene, chlorobenzene, 1,2 dichlorobenzene and ether. The black-colored or unsaturated solution of CNTs is visually non scattering, and no precipitation is observed upon prolonged standing. Like fullerenes, the s-CNTs are insoluble in water, ethanol and acetone.

In accordance with an alternative approach, the attaching step includes: (a) converting the carboxylic acid groups of the CNTs to acid chloride groups by reacting the carbon nanotubes with a reagent selected from a group consisting of $SOCl_2$, $PCL_5$ and any mixtures thereof; (b) mixing the acid chloride converted carbon nanotubes with an amine or alkylaryl amine having the formula $RNH_2$ or $R_1R_2NH$ wherein R, $R_1$ and $R_2=(CH_2)_nCH_3$ and n=9–50 or R, $R_1$, and $R_2=(C_6H_4)(CH_2)_nCH_3$ and n=5–50; and (c) heating the resulting mixture to a temperature between 50–200° C. Still more preferably, the heating is to 90°–100° C. for a least 96 hours.

After attaching the aliphatic carbon chain to the CNTs comes the step of dissolving the processed CNTs in a selected organic solvent. The processed CNTs of the present invention include long branched and/or unbranched alkyl chains that provide substantial solubility in various chlorinated and aromatic solvents including but not limited to tetrahydrofurane, chloroform, benzene, toluene, chlorobenzene, 1,2 dichlorobenzene and ether.

The following examples are presented to further illustrate the invention, but it is not to be considered to be as limited thereto.

EXAMPLE 3

AP-SWNTs→Polished SWNT-COOH→SWNT-COCl s-SWNT-CONH($CH_2)_{17}CH_3$[Soluble, Full-length Single-walled Carbon Nanotubes, as the Covalent Long Chain Amide Derivative]

Polishing 1.10 g of raw soot was heated at 70° C. in 100 mL of 4:1 $H_2SO_4$ (concentrated) to $H_2O_2$ (30%) for 15 minutes. Water (300 mL) was added to the mixture, and it was filtered (membrane pore size 0.2 μm), washed with water, ethanol and dried. Mass recovered: 1.09 g.

Functionalization

The 1.09 g of polished SWNTs (above), were heated in 30 mL of $SOCl_2$ and 10 drops of DMF at 70° C. for 24 hours. The solution was centrifuged at 2000 rpm for 20 minutes. The $SOCl_2$ layer was decanted and dry THF was added in its place. The centrifugation was repeated and the THF layer was again decanted. The resulting solid was dried under vacuum. Mass recovered: 1.26 g.

0.186 g of the SWNT-COCl (above) were heated in 1.37 g of the octadecylamine at 140° C. for 4 days. After cooling, the solid was triturated with EtOH, sonicated for 1 minute, and its contents emptied into another flask. This was repeated until all the contents of the vial were in the flask. Then the flask was sonicated for 10 minutes. The black solid was soluble in THF.

The mixture was transferred to a soxhlet thimble and soxhlet extracted with THF. The solution was taken to dryness with a rotary evaporator and then redissolved in 10 mL of THF. The SWNTs were reprecipitated by addition of 200 mL of EtOH. The solid was separated by filtration (membrane pore size 0.2 μm), washed with EtOH and then dried. Mass recovered: 0.048 g.

EXAMPLE 4

AP-SWNTs→Purified→Polished-COOH→s-SWNT-CONH($CH_2)_{17}CH_3$ [Soluble, Full-length Single-walled Carbon Nanotubes, as the Zwitterionic Salt Terminated Form with a Long Chain Ammonium Salt as Counterion to the Carboxylate Residue on the SWNT]

Purification 1.00 g of raw soot was refluxed at 130° C. in 200 mL of 2 M $HNO_3$ for 48 hours. The solution was centrifuged at 2000 rpm for 30 minutes. The acid layer was discarded, and the solid was transferred to a membrane filter (pore size 1.2 μm), washed with water and dried. Mass recovered: 0.58 g.

Polishing 0.58 of purified SWNTs (above) were heated at 70° C. in 40 mL of 4:1 $H_2SO_4$(concentrated) to $H_2O_2$(30%) for 15 minutes. Water (150 mL) was added to the solution, and it was filtered (membrane pore size 1.2 μm), washed with water and dried. Mass recovered: 0.41 g.

Functionalization 0.107 g of the acid treated, polished SWNTs (above) were heated with 0.507 g of octadecylamine at 140° C. for 4 days. After cooling, the contents of the reaction vial were triturated with EtOH, sonicated for 1 minute, and the contents emptied into a flask. This was repeated until all of the contents of the vial were in the flask. Then the flask was sonicated for 10 min. The contents were filtered (membrane pore size 0.2 Fm), washed with EtOH and dried. The product was partially soluble in THF.

The mixture was filtered through coarse filter paper, and the solution was taken to dryness on a rotary evaporator and redissolved in 10 mL of THF. The SWNTs were reprecipitated by addition of 200 mL of EtOH. The solid was filtered (membrane pore size 0.2 μm), washed with EtOH and dried. Mass recovered: 0.125 g.

EXAMPLE 5

AP-SWNTs→Purified SWNT-COOH→SWNT-COCl→SWNT-CONH($CH_2)_{17}CH_3$[Soluble, Full-length Single-walled Carbon Nanotubes, as the Covalent Long Chain Amide Derivative]

Purification

AP-SWNTs (40–60% of SWNTs) were refluxed in 70% nitric acid until no dense brown vapors could be seen (for 4 g raw soot, it usually takes 4–8 hours when the solution is exposed to the air during the reflux). After centrifugation, the brown-colored supernatant solution was decanted. The precipitate was washed with distilled water several times until the pH of the washings was close to 7 (the supernatant solution was decanted each time following centrifugation). The resulted precipitate was washed with ethyl alcohol and dried at room temperature under reduced pressure. The purity of the SWNTs is around 70–80 volume %, and the yield is 40–50%.

Functionalization

The purified SWNTs (above) were stirred in thionyl chloride containing 1–10% DMF at 70–110° C. for 24–48 hours (40–60 mL thionyl chloride per gram of SWNTs). After centrifugation, the brown-colored supernatant solution was decanted. The precipitate was washed with anhydrous THF, and after centrifugation, the supernatant liquid was decanted. The resulting SWNT-COCl was dried at room temperature under reduced pressure (>90% yield based on purified SWNTs).

A mixture of SWNT-COCl (above) and excess long chain amine (amine: SWNTs (w:w)>8) was heated at 70–140° C. for 24–48 hours. The excess long chain amine was removed by repeated washing with ethyl alcohol. The remaining solid was dissolved in tetrahydrofuran, after filtration, the black-colored filtrate was concentrated on a rotary evaporator. Ethyl alcohol was added to the resulting concentrated solution to precipitate the SWNTs. After membrane filtration, the black solid was washed with ethyl alcohol and dried at room temperature under reduced pressure (70–90% yield based on purified SWNTs).

EXAMPLE 6

AP-SWNTs→Purified SWNT-COOH→s-SWNT-CONH$(CH_2)_7$CH$_3$[Soluble, Full-length Single-walled Carbon Nanotubes, as the Zwitter-ionic Salt Terminated Form with a Long Chain Ammonium Salt as Counterion to the Carboxylate Residue on the SWNT]

Purification

AP-SWNTs (40–60% of SWNTs) were refluxed in 70% nitric acid until no dense brown vapors could be seen (for 4 g raw soot, it usually takes 4–8 hours when the solution is exposed to the air during the reflux). After centrifugation, the brown-colored supernatant solution was decanted. The precipitate was washed with distilled water several times until the pH of the washings was close to 7 (the supernatant solution was decanted each time following centrifugation). The resulting precipitate was washed with ethyl alcohol and dried at room temperature under reduced pressure. The purity of the SWNTs is around 70–80 volume. %, and the yield is 40–50%. Functionalization A mixture of purified SWNTs (above) and excess of long chain amine (amine: SWNTs (weight: weight)>8) was heated at 70–140° C. for 48–72 hours. The excess long chain amine was removed-by repeated washing with ethyl alcohol. The remaining solid was dissolved in tetrahydrofuran, and after filtration, the black-colored filtrate was concentrated on a rotary evaporator. Ethyl alcohol was added to the resulting concentrated solution to reprecipitate the SWNTs. After membrane filtration, the black solid was washed with ethyl alcohol and dried at room temperature under reduced pressure (70–90% yield based on purified SWNTs).

EXAMPLE 7

AP-MWNTs→MWNT-COOH→s-MWNT-COO$^-$$^+$NH$_3$(CH$_2$)$_{17}$CH$_3$[Soluble, Full-length Single-walled Carbon Nanotubes, as the Zwitter-ionic Salt Terminated Form with a Long Chain Ammonium Salt as Counterion to the Carboxylate Residue on the MWNT]

Purification

AP-MWNTs (~10% of SWNTs) were refluxed in 70% nitric acid for 4–12 hours, then cooled to room temperature. After centrifugation, the light brown-colored supernatant solution was decanted. The precipitation was washed with distilled water several times until pH is close to 7, the supernatant solution was decanted each time by centrifugation. The resulting precipitation was washed with ethyl alcohol and dried at room temperature under reduced pressure.

Functionalization

A mixture of the resulting MWNTs and excess of long chain amine (weight of amine: weight of MWNTs>8) was heated at 70–140° C. for 12–24 hours. The excess long chain amine was removed by repeated washing with ethyl alcohol. The remaining solid was dissolved in tetrahydrofuran, and after filtration, the black-colored colloidal solution was concentrated on a rotary evaporator. Ethyl alcohol was added to the resulting concentrated colloidal solution to precipitate the MWNTs. After membrane filtration, the black solid was washed with ethyl alcohol and dried at room temperature under reduced pressure (1–5% yield based on raw soot).

EXAMPLES 8–62

The procedures of examples 3–7 are repeated except that nonylamine, dodecylamine, pentacosylamine, tetracontylamine, pentacontylamine, 4-pentylaniline, 4-dodecylaniline, 4-tetradocylaniline, 4-pentacosylaniline, 4-tetracostyIaniline or 4-pentacontylaniline is substituted for octadecylamine.

In summary, the method of the present invention includes the preparation of solutions of naked full length or unshortened carbon metals and semiconductors in organic solutions including both ionic (charge transfer) and covalent solution phase chemistry with concomitant modulation of the CNT band structure. It is now possible to obtain well-characterized, highly purified CNT materials which are suitable for physical property measurements. The CNTs have a rich chemistry at their ends, the exterior walls and the interior cavity. The CNTs are versatile precursors to copolymer materials with distinctive mechanical and electrical properties and is new ligands for metal complexation.

What is claimed is:

1. A method of solubilizing carbon nanotubes in a selected organic solvent, comprising:

terminating said carbon nanotubes with carboxylic acid groups; and attaching an aliphatic carbon chain to said terminated carbon nanotubes so as to render said carbon nanotubes soluble in said selected organic solvent.

2. The method of claim 1, wherein said terminating step includes reacting said carbon nanotubes with a mineral acid.

3. The method of claim 1, wherein said terminating step includes adding a mineral acid to an aqueous suspension of said carbon nanotubes.

4. The method of claim 1, wherein said attaching step includes directly reacting said carbon nanotubes with an amine having a formula RNH$_2$ or R$_1$R$_2$NH wherein R, R$_1$ and R$_2$=(CH$_2$)$_n$CH$_3$ where n=9–50.

5. The method of claim 1, wherein said attaching step includes directly reacting said carbon nanotubes with an alkylaryl amine having a formula RNH$_2$ or R$_1$R$_2$NH wherein R, R$_1$ and R$_2$=(C$_6$H$_4$)(CH$_2$)$_n$CH$_3$ where n=5–50.

6. The method of claim 1, wherein said attaching step includes:

(a) converting said carboxylic acid groups to acid chloride groups by reacting said carbon nanotubes with a reagent selected from a group consisting of $SOCl_2$, $PCl_5$ and any mixtures thereof;

(b) mixing the acid chloride converted carbon nanotubes with an amine or alkylaryl amine having the formula $RNH_2$ or $R_1R_2NH$ wherein R, $R_1$ and $R_2=(CH_2)_nCH_3$ and n=9–50 or R, $R_1$, and $R_2=(C_6H_4)(CH_2)_nCH_3$ and n=5–50; and (c) heating the resulting mixture to a temperature between 50–200° C.

7. The method of claim 6, wherein said heating step is to 90°–100° C. for at least 96 hours.

* * * * *